United States Patent Office 3,832,339
Patented Aug. 27, 1974

3,832,339
POLYAZO PIGMENTS OF THE 2 - HYDROXY-NAPHTHALENE-3-CARBOXYLIC ACIDARYLIDE SERIES
Emil Stocker, deceased, by Heidi Berta Stocker-Boller, representative, Riehen, Ernfred Schnabel, Reinach, and Georg Anton Klein, Bottmingen, Switzerland, assignors to Ciba-Geigy AG, Basel, Switzerland
No Drawing. Filed June 22, 1971, Ser. No. 155,612
Int. Cl. C09b 43/12; D06p 1/52, 3/54
U.S. Cl. 260—144                         2 Claims

ABSTRACT OF THE DISCLOSURE

Polyazo pigments of the formula

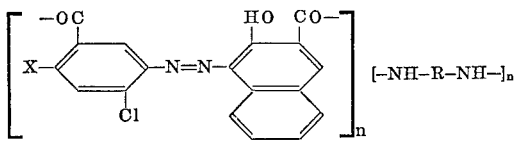

wherein R is an arylene group, the bonds to which are not in the ortho-position, X is hydrogen or chlorine atom and n is a whole number greater than 3, are useful for coloring plastics and lacquers, especially soft polyvinyl chloride in red shades with good light and sublimation fastness properties.

---

This invention relates to polyazo pigments.

Polyazo pigments and their manufacture by condensation of azo compounds containing two carboxylic acid chloride groups with monoamines or azo compounds containing one carboxylic acid chloride group with diamines are known, for example from French Pat. 1,054,935 and its Addition Pat. 68,658. Furthermore, in French Pat. 1,307,797, condensation products are described from 1 mol of an azo compound containing two carboxylic acid chloride groups with a mono amine in a volume proportion of 1:2. In U.S. Pat. 3,403,200, polymeric azo dyestuffs are described which are formed from azo compounds containing two amino groups and dicarboxylic acid chlorides. These products are more or less soluble in organic solvents, particularly in application media, possess a low softening point and, because they form no pigment particles, give transparent colourations in lacquers.

It has now been found that valuable polyazo pigments of general formula I

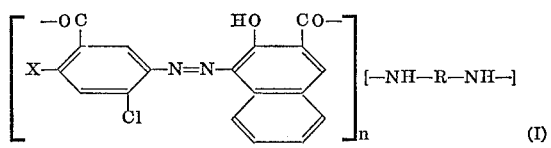

wherein R is an arylene group, the bonds to which are not in orthoposition, and X is hydrogen or chloride, and wherein n is a whole number greater than 3, are obtained if a dyestuff dicarboxylic dichloride of the general formula II

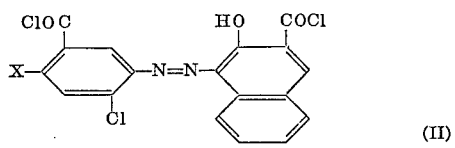

wherein X has the meaning noted above, is condensed with aromatic diamines, the amino groups of which are not in ortho-position to one another, in a molecular ratio of approximately 1:1. Particularly preferred diamines are benzene, naphthaline and diphenyl series diamines.

Preferred as starting materials are dicarboxylic chlorides of the formula II in which X is a hydrogen. The dicarboxylic acid chlorides of formula II can be prepared according to known methods, e.g. by reacting the dyestuff dicarboxylic acid with thionylchloride in an inert organic solvent medium, suitably in the presence of dimethylformamide.

Among aromatic diamines, there should be mentioned especially 1,4-diamino-2,5-dichlorobenzene. Further diamines of value are 2-chloro-5-methyl-1,4-phenylenediamine, 3,3'-dichlorobenzidene, and 1,5-diaminonaphthalene. On the basis of their infusibility and insolubility, and on the basis of analytical data, it can be shown that, according to the starting materials and reaction conditions, the products are large molecules with a few dyestuff and diamine groups ranging up to highly condensed large molecules. In this, the maximum attainable degree of condensation, i.e. the number n, is not determinable. The formation of macro rings should not be excluded. As in the known process for manufacturing carboxylic acid arylamides, the condensation is carried out with heating in high boiling aprotic organic solvents, e.g. in 1,2-dichlorobenzene, 1,2,4-trichlorobenzene, nitrobenzene, 1-chloronaphthalene, xylene, chlorobenzene, tetrachlorethane, with or without the addition of acid binding agents such as quinoline.

Thus for example working with 1 mol each of

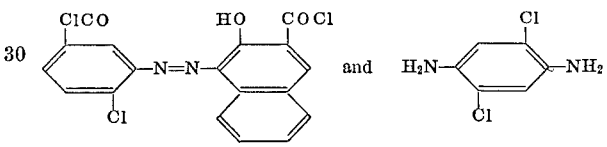

in 1-chloronaphthaline at 245° C., a strongly coloured pure red polyazo pigment with a chlorine content of 21.1% is obtained. With complete condensation, for the formula

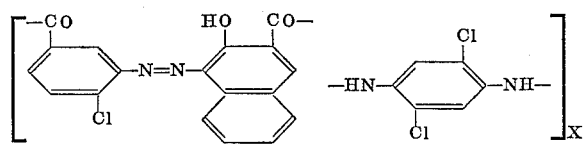

a calculated chlorine content of 20.8% is obtained. If at the start a molecular ratio somewhat different from 1:1 is chosen, or if the condensation is effected to a greater or lesser degree according to the reaction conditions, assessed in terms of chlorine content, then pigments with very similar properties result. Powder X-ray studies of the above noted polyazo pigments reveal a number of weak lines and one strong line which corresponds to a grating separation of 3.28 Angstrom.

The new dyestuffs are valuable pigments which can be used in finely divided form for pigmenting high molecular weight organic material, e.g. cellulose ethers and esters, super polyamides, or super polyurethanes or polyesters, acetylcellulose, nitrocellulose, natural or synthetic resins, such as polymerized resins or condensation resins, e.g. aminoplasts, particularly urea- and melamine-formaldehyde resins, alkyd resins, phenoplasts, polycarbonates, polyolefins, such as polystyrene, polyvinylchloride, polyethylene, polypropylene, polyacrylonitrile, polyacrylic acid esters, rubber, casein, silicones and silicone resins, all of these either individually or in admixture.

In this connection, it is of no matter whether the high molecular weight compounds noted are used as plastic compositions, melts, or in the form of spinning solutions, lacquers or printing inks. According to the particular use, it is advantageous to employ the new pigments as toners in the form of preparations.

Compared to monoazo pigments, which are obtained in known fashion from the same dyestuff dicarboxylic acid dichloride and 2 mol monoamine, such as

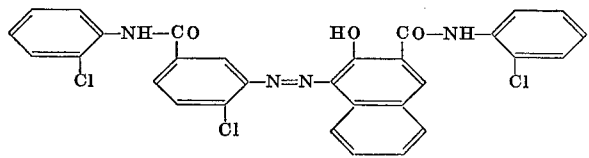

or

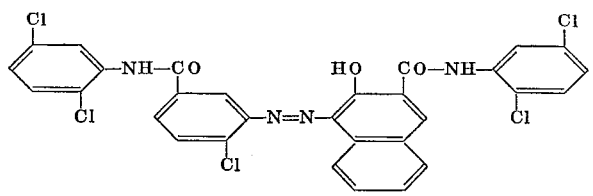

the polyazo pigments according to the invention are distinguished by much improved light and migration fastness in soft polyvinyl chloride.

The invention is further illustrated by way of example with reference to the following specific examples, in which all temperatures are given in degree Centigrade.

EXAMPLE 1

0.885 g. 1,4-diamino - 2,5 - dichlorobenzene are added with stirring to 200 ml. 1-chloronaphthalene at a temperature of 248°, and shortly thereafter a slurry of 2.04 g. 6'-chloro - 3' - chlorocarbonylbenzene-(1')-azo-(1)-2-hydroxy-3-chlorocarbonyl naphthalene in 50 ml. 1-chloronaphthalene is added. The mixture is then heated with stirring for 3 hours under reflux to a temperature of 245–250°, at which temperature HCl is given off. Thereafter the mixture was cooled to 150° and the pigment formed filtered off, washed with hot 1-chloronaphthalene, then with methanol, water and again with some methanol. After drying at 60° 2.4 g. of a red pigment was obtained which contained 21.1% chlorine (calculated value for full condensation 20.8%). In soft polyvinyl chloride, this pigment gave a very pleasing red shade of high migration fastness and very good heat and light fastness. In polypropylene, the material also had a high heat fastness.

If the mixture of 1-chloronaphthalene and pigment formed was introduced into 60 ml. benzoylchloride before washing with methanol and water, and the mixture then allowed to boil under reflux for one hour with stirring, then filtered hot and subsequently washed with chlorobenzene, methanol, water and methanol, and then dried at 60°, then a pigment was obtained with even better light fastness.

If after the addition of the diaminodichlorobenzene, 2.60 g. quinoline are additionally added, and otherwise the process first described above is carried out, then a very similar pigment is produced with a chlorine content of 20.7%.

EXAMPLE 2

0.783 g. 1,4-diamino-2-chloro-5-methylbenzene were dissolved with stirring in 200 ml. of heated nitrobenzene at 208°, and thereafter a slurry of 2.04 g. 6'-chloro-3'-chlorocarbonyl - benzene-(1')-azo-(1)-2-hydroxy-3-chlorocarbonyl naphthalene in 50 ml. nitrobenzene was added. After 3 hours boiling under reflux, HCl generation had ended. The mixture was cooled to 150°, the pigment filtered off, washed with hot nitrobenzene, and then with methanol, water and again with methanol. After drying at 60° C., 2.3 g. of a red pigment were obtained which contained 14.6% chlorine (calculated value for full condensation 14.4%). This was suitable for pigmenting soft polyvinyl chloride and had an attractive red shade of very good migration fastness and of good light fastness.

EXAMPLE 3

0.885 g. 1,4-diamino-2,5-dichlorobenzene were added with stirring to 250 ml. 1,2,4-trichlorobenzene at 212°, and immediately thereafter a slurry of 2.21 g. 4',6'-dichloro-3'-chlorocarbonyl benzene-(1')-azo-(1)-2-hydroxy - 3-chlorocarbonyl-naphthalene in 50 ml. 1,2,4-trichlorobenzene was added. After 3 hours boiling under reflux, the resulting pigment was filtered off at 150°, washed with hot 1,2,4-trichlorobenzene and then with methanol, water and methanol.

After drying, 2.6 g. of an attractive red pigment was obtained which contained 26.1% chlorine (calculated value for full condensation 25.9%). In soft polyvinyl chloride this pigment was fully migration fast and had good light fastness.

EXAMPLE 4

A slurry of 2.04 g. 6'-chloro-3'-chlorocarbonyl benzene - (1')-azo-(1)-2-hydroxy-3-chlorocarbonyl naphthalene in 50 ml. 1,2,4-trichlorobenzene was added to a solution at 212° of 1,265 g. 4,4'-diamino-3',3-dichlorodiphenyl in 250 ml. 1,2,4-trichlorobenzene, and the mixture was then allowed to boil under reflux for 3 hours, whereon HCl was evolved. Thereafter the pigment was filtered off at 150°, washed with hot 1,2,4-trichlorobenzene, then with methanol, water and methanol, and dried at 60°. 2.8 g. of a product was obtained which contained 19.6% chlorine (calculated value for full condensation 18.1%). In soft polyvinyl chloride this gave red shades of very good migration fastness and of good light fastness.

EXAMPLES 5–11

If in place of the diamines noted in Example 4, equimolar quantities of the following diamines are used, then pigments are obtained with the subsequently given analysis data and shades: The calculated figures for chlorine are based on full condensation at a molecular ratio of 1:1:

TABLE

| | | Chlorine | | |
|---|---|---|---|---|
| Ex. | Diamine | Found | Calc. | Shade |
| 5 | 1,4-diamino-2-chlorobenzene | 15.3 | 14.8 | Red. |
| 6 | 1,4-diamino-2,5-dimethyl-benzene. | 9.6 | 7.53 | Dull red. |
| 7 | 1,4-diamino-2,5-dimethoxy-benzene.. | 7.3 | 7.05 | Brown red. |
| 8 | 1,4-diamino-2,5-diethoxy-benzene. | 7.1 | 6.68 | Brown. |
| 9 | 1,5-diaminonaphthalene | 7.8 | 7.20 | Dull red. |
| 10 | 4,4'-diamino-3,3'-dimethoxy-diphenyl. | 6.7 | 6.12 | Do. |
| 11 | 4,4'-diamino-2,2'-dichloro-5,5'-dimethoxydiphenyl. | 17.5 | 16.4 | Pure red. |

All these pigments are very migration fast in soft polyvinyl chloride.

EXAMPLE 12

A stabilised mixture of the following:

65 g. of an emulsion polyvinyl chloride with a K-value 72–74 ("Lonza GB," ex Lonza A.G., Basel), 32 g. dioctylphthalate, 3 g. of an epoxidised soya oil ("Advaplast 39," Deutsche Advance G.m.b.H., Marienberg), 1.5 g. of a complex of barium and cadmium fatty acids salts, complexing agents and anti-oxidants as stabiliser ("Advastab B C 26," Deutsche Advance G.m.b.H., Marienberg), 0.5 g. of a costabiliser on the basis of organic phosphite compounds ("Advastab CH 300," Deutsche Advance G.m.b.H., Marienberg), 5 g. titanium dioxide ("Titanium Dioxide RN 56," Titangesellschaft G.m.b.H., Leverkusen) and 0.5 g. of pigment of Example 1 were prepared for 8 minutes at 160° on a roll mixer with a roll speed (r.p.m.) of 20:24 (friction 1:1.2) and a roll separation of 0.3 mm. The red colouration of the soft polyvinyl chloride sheet so obtained had a very good fastness to migration, friction, heat and light.

EXAMPLE 13

The following were mixed together on a roller plate according to the dry colouring process:

100 g. polypropylene granules ("Moplen S 50 G," Montecatini A.G. Milan),
1.0 g. titanium dioxide ("Titanium Dioxide RN 56," Titangesellschaft G.m.b.H., Leverkusen) and
0.1 g. of the pigment of Example 1.

The ruddy coloured granulate was then put in a "Drais-Labor-Gelimat" mixer type G, and premixed for 5 seconds at 3000 r.p.m. and then plasticised for 30 seconds at 4000 r.p.m., by means of which the pigment was regularly and finely dispersed in the polypropylene. The material was then pressed to plate form 0.5 mm. thick for 5 minutes at 170°.

The red colouration of the resulting plate of polypropylene had very good heat fastness.

EXAMPLE 14

A stoving lacquer was made up as follows:

20 g. titanium dioxide "Titanium Dioxide RN 57" (Titangesellschaft G.m.b.H., Leverkusen),
40 g. of a 60% solution of a cocoalkyd resin in xylene (mixed polymer of coconut oil fatty acids, phthalic acid and pentaerythritol),
24 g. of a 50% solution of a melamine resin "Super Beckamine 852" (Reichhold-Chemie, Hamburg) in butanol,
8 g. xylene,
7 g. ethylene glycol monomethyl ether and
1 g. of the pigment of Example 1.

This stoving lacquer was sprayed onto an aluminium sheet, allowed to dry, and then stoved for 30 minutes at 120°.

The red colouring is very fast to light, solvents and heat and has good covering power.

What is claimed is:
1. A polyazo pigment of the formula:

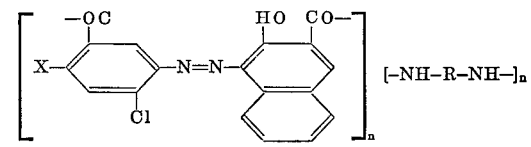

wherein R is 2,5-dichloro-1,4-phenylene, 2-methyl-5-chloro-1,4-phenylene, 3,3'-dichloro-4,4'-diphenylene or 1,5-naphthylene, the bonds to which are not in the ortho position, $x$ is hydrogen or chlorine and $n$ is a whole number greater than 3.

2. A polyazo pigment according to claim 1 wherein X is hydrogen.

References Cited
UNITED STATES PATENTS

| | | | |
|---|---|---|---|
| 2,030,970 | 2/1936 | Dahlen | 260—166 X |
| 2,150,191 | 3/1939 | Rossander | 260—166 X |
| 2,988,544 | 6/1961 | Frey et al. | 260—173 |
| 2,994,693 | 8/1961 | Blake et al. | 260—144 |
| 3,183,225 | 5/1965 | Dreyfuss | 260—167 |
| 3,278,486 | 10/1966 | Meek et al. | 260—144 X |
| 3,403,200 | 9/1968 | Randall | 260—857 |
| 3,501,444 | 3/1970 | Bach | 260—78 TF |
| 3,555,004 | 1/1971 | Bach | 260—181 |
| 3,597,393 | 8/1971 | Bach et al. | 260—47 CP |
| 3,644,283 | 2/1972 | Bach | 260—47 CZ |

FLOYD D. HIGEL, Primary Examiner

U.S. Cl. X.R.

8—4; 106—20, 288 Q, 308 R, 308 Q; 117—123 R, 138.8 B, 138.8 D, 138.8 F, 138.84 A, 138.8 V, 138.8 E; 260—37 R, 40 R, 41 C, 166, 203